(12) United States Patent
Chen et al.

(10) Patent No.: US 10,728,085 B1
(45) Date of Patent: Jul. 28, 2020

(54) MODEL-BASED NETWORK MANAGEMENT

(71) Applicant: Amazon Technologies, Inc., Seattle, WA (US)

(72) Inventors: Po-Chun Chen, Herndon, VA (US); Shuai Ye, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/927,690

(22) Filed: Mar. 21, 2018

Related U.S. Application Data

(63) Continuation of application No. 14/854,257, filed on Sep. 15, 2015, now abandoned.

(51) Int. Cl.
*H04L 12/24* (2006.01)
*H04L 12/58* (2006.01)

(52) U.S. Cl.
CPC ........ *H04L 41/0659* (2013.01); *H04L 41/145* (2013.01); *H04L 51/046* (2013.01); *H04L 51/18* (2013.01)

(58) Field of Classification Search
CPC ... H04L 41/0659; H04L 51/18; H04L 51/046; H04L 41/145
See application file for complete search history.

(56) References Cited

U.S. PATENT DOCUMENTS

| | | | | |
|---|---|---|---|---|
| 6,405,250 B1* | 6/2002 | Lin | ...................... | H04L 41/046 700/29 |
| 6,654,914 B1* | 11/2003 | Kaffine | ............... | H04L 41/0631 714/4.2 |
| 7,965,621 B2* | 6/2011 | Farkas | .................. | H04L 12/462 370/216 |
| 8,018,860 B1* | 9/2011 | Cook | .................... | H04L 41/145 370/218 |
| 10,263,836 B2* | 4/2019 | Jain | ...................... | H04L 41/0686 |
| 2002/0010750 A1* | 1/2002 | Baretzki | ............. | G06F 11/0709 709/208 |
| 2002/0178243 A1* | 11/2002 | Collins | ................. | H04L 41/046 709/223 |
| 2006/0173856 A1* | 8/2006 | Jackson | ................ | G06F 9/5061 |
| 2007/0169192 A1* | 7/2007 | Main | ..................... | G06F 21/554 726/22 |
| 2009/0292948 A1* | 11/2009 | Cinato | .................... | H04L 43/00 714/26 |
| 2010/0124165 A1* | 5/2010 | Yang | ................... | H04L 41/0663 370/217 |
| 2011/0035202 A1* | 2/2011 | Quinn | ................. | H04L 41/0631 703/13 |
| 2012/0117009 A1* | 5/2012 | Dutt | ........................ | G06N 7/005 706/12 |
| 2013/0010610 A1* | 1/2013 | Karthikeyan | ......... | H04L 41/069 370/242 |
| 2013/0124908 A1* | 5/2013 | Gowin | ................ | G06F 11/0793 714/2 |

(Continued)

*Primary Examiner* — Tejis Daya
(74) *Attorney, Agent, or Firm* — BakerHostetler

(57) ABSTRACT

In a provider network, data indicative of an operational state of the computing devices of the provider network is processed by an inference engine. The inference engine is configured to model operational characteristics of the computing devices of the provider network. The inference engine determines a potential fault condition for one of the computing devices of the provider network. A remedial action is invoked.

19 Claims, 7 Drawing Sheets

(56) References Cited

U.S. PATENT DOCUMENTS

| | | | |
|---|---|---|---|
| 2013/0258843 A1* | 10/2013 | Kurita | H04L 43/12 370/229 |
| 2014/0006843 A1* | 1/2014 | Kim | G06F 11/2002 714/4.1 |
| 2014/0078882 A1* | 3/2014 | Maltz | H04L 41/0883 370/216 |
| 2015/0135012 A1* | 5/2015 | Bhalla | H04L 41/147 714/26 |
| 2015/0289230 A1* | 10/2015 | Sacades | H04W 24/10 455/458 |

* cited by examiner

US 10,728,085 B1

MODEL-BASED NETWORK MANAGEMENT

CROSS-REFERENCE TO RELATED APPLICATION

The present application is a continuation of, and claims priority to, U.S. patent application Ser. No. 14/854,257, filed Sep. 15, 2015 and entitled "MODEL-BASED NETWORK MANAGEMENT", the contents of which are incorporated herein by reference in its entirety.

BACKGROUND

A data center is a facility that houses computer systems and various networking, storage and other related components. Data centers may, for example, provide computing services to businesses and individuals as a remote computing service or to provide "software as a service" (e.g., cloud computing). When a failure of a computing component or a networking component occurs, customers may lose data or have limited access to data, and may be unable to provide services to their downstream customers, resulting in lost revenue and customer dissatisfaction.

BRIEF DESCRIPTION OF DRAWINGS

References are made to the accompanying drawings that form a part hereof, and that show, by way of illustration, specific embodiments or examples. The drawings herein are not drawn to scale. Like numerals represent like elements throughout the several figures. In the figures, reference numbers may be reused to indicate correspondence between referenced elements. The drawings are provided to illustrate example embodiments described herein and are not intended to limit the scope of the disclosure.

DETAILED DESCRIPTION

Figure 1:
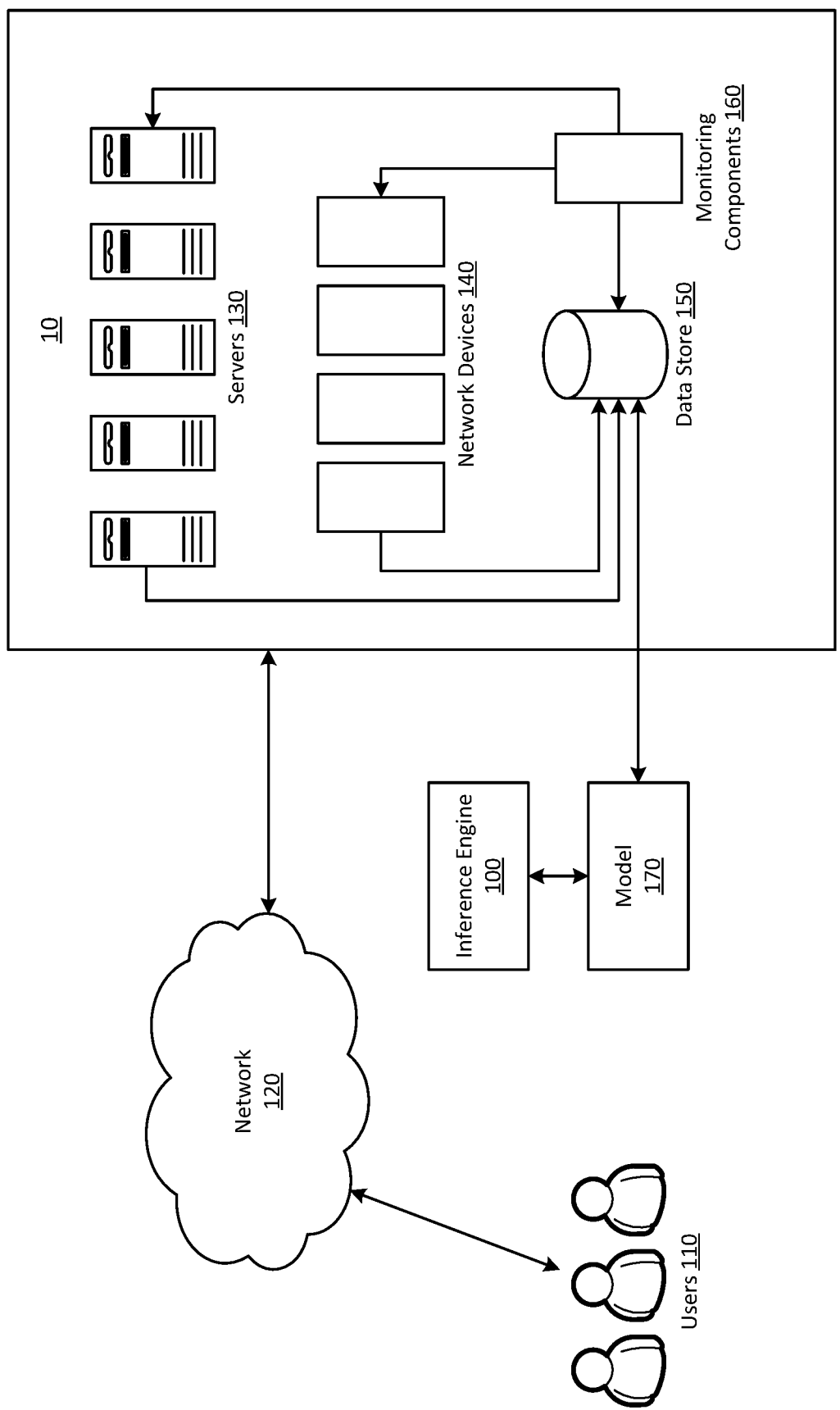
FIG. 1 is a diagram illustrating a mechanism for managing operability of a provider network in accordance with the present disclosure.

As more companies move their software platforms and services to provider networks and as the scale of the provider networks grows, the provider networks are faced with scalability issues for managing their rapidly growing network infrastructure. Due in part to this rapid growth, management of the provider network's infrastructure, such as network devices, has become operationally difficult. The growth of the number of network devices may increase at a faster rate than the ability of maintenance personnel to adequately handle network service issues. Issues that may arise include 1) expected, unavoidable failures (e.g., hardware failure) and 2) recovery from events (e.g., electric outage). Therefore, automation may play an important role for maintenance at provider networks as growth continues.

The network infrastructure of a provider network can be highly complex. There can be multiple layers of network fabrics that may be built on top of each other. Each network fabric may have its own objectives, system requirements, failure modes, capacity models, dependencies on other networks, etc. Consequently, it may be difficult to determine uniform rules that can be applied to all situations or suitable for all types of devices. The management and decision criteria for one network fabric can be very different from another network fabric, which can make automation more challenging and complicated. A provider network may also have a number of data centers, each of which may house many thousands of components such as servers, storage devices, and network devices. Technologies such as virtualization can increase this complexity. The computing environments may include a mix of various types of data flowing through both virtual and physical components. Devices such as servers and routers may have complex interactions, and behaviors in one area can affect the performance of other areas of the computing environment. When a device fails, troubleshooting the problem can be a difficult process due to the issues outlined above.

Additionally, troubleshooting networking issues may require a wide range of information, and may have to be performed in many cases based on partial information. Information may be incomplete due to the desired information being unavailable to the personnel performing troubleshooting (e.g., the information is located outside of the system that performs the troubleshooting—on a network router on an Internet link between a customer and a troubleshooting tool that is not configured to provide the desired information to the tool, such as a routing table). Additionally, troubleshooting may require experience to know what missing information needs to be collected. Gathering every piece of missing information may be time-consuming and may also ultimately be unnecessary in the troubleshooting process.

Even when the cause of a problem is found, the loss of the device may result in lost data, down time, and customer dissatisfaction. It would be useful to be able to more efficiently troubleshoot failures at the provider network, or to be able to monitor information and prevent a failure or mitigate the effects of a failure before it actually occurs. Failure prevention can allow the service provider to take preemptive measures such as bringing another device online, reconfigure the network to accommodate the removal of failed devices, and thus avoid problems associated with an unexpected loss of a device and its associated services.

In various embodiments, this disclosure describes methods and systems for scalably monitoring devices and networks in a provider network, automatically identifying potential issues, and taking remedial action. In some embodiments, a model is implemented that captures the signature and requirements for each type of computing and network device at the provider network, including their failure scenarios and capacity models. Based on the model, when a failure or other event occurs, such as when a hardware failure occurs or a dependency becomes unstable, the anomaly can be recognized by comparing available information against the model. Corresponding remedial actions may then be identified and executed.

In some embodiments, an inference engine may be utilized that implements forward-chaining rules that describe various service events. The forward-chaining rules may include, for example, a number of antecedents and corresponding consequents. When antecedents of a rule are satisfied, the rule may cause the execution of its corresponding consequent. The consequent can be defined, for example, as an action such as "take device A out of service."

After the actions have been taken, the service associated with the removed or deactivated device may be returned to a functioning state, which may operate with reduced capacity due to the removed or deactivated device. In order to bring the service back into a normal state, the removed or deactivated device may be continuously monitored. The model may, based on the monitored information, be configured to determine that the removed or deactivated device has been repaired or is otherwise available for use in the network. A predefined procedure may be activated to activate the device and restore the service to its original state.

Referring to FIG. 1, illustrated is an example system for managing operability of a provider network in accordance with the present disclosure. In FIG. 1, a data center 10 may include resources and applications that may execute, for example, on one or more servers 130 and one or more network devices 140.

FIG. 1 also illustrates a communications network 120 that may include one or more computers accessible by users 110. According to one embodiment, resources executing on servers 130 may be configured to provide computing services to users 110 via network 120. For example, a resource may provide a set of remote access enterprise applications to a group of users who may, for example, be employees of an enterprise customer. FIG. 1 also illustrates a data store 150 that may store data pertaining to various parameters and metrics for servers 130 and network devices 140.

A request may be sent to an inference engine 100 for requesting, monitoring, accessing, receiving, storing, and analyzing operational, diagnostics, and other data pertaining to one or more of the servers 130 or network devices 140. In some embodiments, a request may be received from one or more services at the service provider. Alternatively, the inference engine 100 may run continuously in an automated fashion. In response to receipt of any requests inference engine 100 may log the request and provide updates as to the status of the request. The inference engine 100 may communicate with other services to facilitate: (1) processing of the request, (2) collection of data pertaining to request, and (3) generating interfaces to provide results of the request. The inference engine 100 may, for example, provide a user interface for facilitating submission of the request. The inference engine 100 may further provide a user interface for viewing the results of the request, modifying the request, or cancelling the request. As mentioned, the inference engine 100 may execute in an autonomous fashion and perform some or all of the above functions without being caused by requests.

Inference engine 100 may be configured to provide analysis and diagnostics for faults based on real-time or accumulated and/or archived monitoring of various devices such as servers 130 or network devices 140. The inference engine 100 may access diagnostics data and metrics that are available from various logs and other sources. The inference engine 100 may be made accessible via an application programming interface (API) or a user interface that may be accessed via a Web browser or other input mechanisms.

In some embodiments, the inference engine 100 may implement or have access to a model 170 that captures the signature and requirements of the devices of the provider network. FIG. 1 also depicts monitoring components 160 that may be located at various locations at the provider network. The monitoring components 160 may be configured to detect operational events and real-time service impairments. In various embodiments, the monitoring components 160 may be implemented as software executing on one or more computing devices, or standalone devices that are in communication with networks of the provider network.

The inference engine 100 may be configured to logically identify problems and trigger actions in response to the identified problems. In various embodiments, components for alert and notification (not shown in FIG. 1) may be implemented to notify service owners before and after an action is taken. Additionally, an execution engine (not shown in FIG. 1) may be implemented that executes action requests from the inference engine. The execution engine may also report the results.

In one embodiment, the monitoring components 160 may be configured to access current and previously transmitted diagnostic information for the provider network. For example, some computing resources may periodically send diagnostic information for collection and storage, which can be accessed at a later time. The diagnostic information may be useful for troubleshooting future faults, or for analysis, trending, and predictive analysis.

The monitoring components 160 may also be configured to access diagnostic information from one or more computing resources via an out-of-band communication channel. The out-of-band communication channel may include an interface that is operative even when the computing resource is not in a normal operating state. The previously transmitted diagnostic information and the accessed diagnostic information may be stored for fault analysis.

The monitoring components 160 may monitor information for a single resource or for multiple resources. For example, one of the monitoring components 160 may cover all network devices in a region or zone. Furthermore, some information requests can be on-demand, and the information can be requested for specific time frames, thus allowing for greater control over the data collection times as compared to a push-type system where the resources may only self-report diagnostic information. By providing an on-demand mechanism for obtaining diagnostic information, the administrators of a data center may be able to better customize diagnostic information collection on a larger scale and as the data becomes desired for analysis.

While the present disclosure describes examples in terms of failures of network devices such as routers, it should be understood that the disclosed principles may be applied to other types of facilities and devices. For example, an event can be any type of system impairment such as failure of a server or storage device.

In some embodiments, the model 170 can implement an expert system configured to allow for logical inferences based on available information that is known to determine possible solutions to a network connectivity problem. The expert system may receive information that is known about the state of the network and uses the information as input to the inference engine 100. The some embodiments, the inference engine 100 may be a forward-chaining rules-based inference engine. The inference engine 100 may process the information and generate one or more hypotheses of a cause of the network connectivity problem. In one embodiment, the hypotheses may be input to backward-chaining reasoning rules to determine additional information that can either increase or decrease the likelihood that the hypotheses are true. In some embodiments, the known information, the hypothesis or hypotheses, and the additional information may then be provided to a Bayesian process to determine a probability that each hypothesis is correct.

By performing forward chaining, backward chaining, and performing a Bayesian analysis, the model 170 may allow for continuous updating and fine tuning of the model. For example, instead of merely indicating that "the network link is down," this system may provide information to the user that there is a 40% chance that a devices needs to be removed for service.

To illustrated one example of managing operability of a provider network comprising a plurality of network devices as described herein, when the provider network implements a number of edge routers that operate at the edge of the provider network, the monitoring components 160 may observe elevated error rates on a network address translation device and capture information associated with the elevated error rates. The inference engine 100 may process the captured information and determine whether it is safe to take the faulty network address translation device out of service. If it is safe to do so, the inference engine 100 may send a request to the execution engine to take the faulty network address translation device out of service. Similarly, if elevated errors are observed on multiple interfaces of an edge router, the inference engine 100 may perform what-if analysis to determine if the provider network still has sufficient capacity to forward all customer traffic when the faulty edge router is out of service If it is safe to do so, the inference engine 100 may send a request to the execution engine to execute the appropriate procedure to place the faulty edge router into maintenance mode.

As another example, when an Internet connection to an virtual private network (VPN) endpoint is observed by the monitoring components 160 as having increasing packet loss, the inference engine 100 may identify the instability of this particular connection. The inference engine 100 may check redundancy models of model 170 and confirm that the other redundant connection is still available and stable. The inference engine 100 may further perform what-if analysis to confirm that the redundant connection does have sufficient capacity to support the service when the unstable connection is torn down. The inference engine 100 may send a request to the execution engine or a notification function to notify owners of the affected services. The inference engine 100 may then send a request to the execution engine to switch off the unstable connection. The inference engine 100 may send a request to the execution engine or a notification function to send a notification regarding the completion of the action and the results of the action.

In various embodiments, inference engine 100 or another function in conjunction with the inference engine 100 may manage the collection and analysis of operational and diagnostic information in response to requests, events, and predetermined information collection events. Monitoring components 160 may collect information from servers 130 and other network devices 140, among others, and store the information in data store 150. Inference engine 100 may access information regarding the operating environment of the provider network from sources such as data store 150. The inference engine 100 may also access information stored in log files and other locations. The information may also be obtained by querying devices for data that is not currently being stored in a log file.

In some cases, inference engine 100 may not have access to all available data for relevant devices of interest because doing so would take too much time, would require too much storage space to store, or some of the data has been determined to have a low likelihood of being relevant to the device of interest. In other cases, some of the data may be configured to be accessible only manually or may be unavailable because it is on a network segment to which the inference engine 100 does not have access. The inference engine 100 may use the available information for an initial analysis and update the analysis as more information becomes available.

In some embodiments, the analysis performed by inference engine 100 may be performed based on machine learning via a machine learning system that includes one or more learning functions that learns the probabilities associated with the availability of various data that may be relevant to determination of failure causes.

In some embodiments, the monitoring components 160 may monitor events and device parameters automatically. For example, the service provider may monitor a number of pre-selected events collected or determined at a predetermined frequency. Additional event data may be collected at the same or different frequencies as specified by the service provider. It should be understood that the event data may be collected for any of the computing resources provided by the service provider including servers, databases, storage, and the like. Various event data may be stored in log files or routing tables on various components, or log files for the components may be stored in another location (e.g., all of the components may store their log files on an object-level storage). This data may also be obtained by querying components for data that is not currently being stored in a log file, such as current processor utilization, or by pinging a component to see if it is able to be reached, and respond via a network connection.

Additionally, the inference engine 100 may provide various users with the ability to request and receive notifications or to take specified actions depending on the events. For example, the service provider may receive a request from a user to migrate data from a server that is predicted to fail, before shutting down the server. In some embodiments, the event data may be retained for a predetermined time to allow maintenance personnel to retrieve historical metric data for independent review and analysis. A user interface may be provided to allow access to the inference engine 100.

In some embodiments, a time frame for the collection of operational and diagnostic information may be specified as well as the devices to be monitored. For example, maintenance personnel may want to collect diagnostic information for a bank of servers on an hourly basis over a period of one month.

In some embodiments, an application programming interface (API) may be provided to facilitate requests for diagnostic information. For example, an API can be called with information such as a device identifier, event type, and time frame that pertains to the operational and diagnostic information. After the API is called, in one embodiment the inference engine 100 may take actions such as:
  Access diagnostic information logs for the device,
  Call additional APIs that can provide additional diagnostic information for the device,
  Invoke a diagnostic information analysis function.

Using the gathered information, the model 170 may store the operational and diagnostic information, analyze the operational and diagnostic information, combine or aggregate the data or extract portions of the operational and diagnostic information as appropriate, and invoke an operational and diagnostic information analysis function.

The inference engine 100 may, in one embodiment, may begin determination of a consequent by identifying information pertaining to a monitored network. For example, in reference to the operating environment of FIG. 1, model 170 may gather data from another component of the operating environment through monitoring components 160. Some of this data may be stored in log files or routing tables, or log files stored in another location. This data may also be obtained by querying various devices for data that is not currently being stored in a log file, such as current processor utilization, or by pinging a component to see if it is able to be reached and respond via a network connection.

Model 170 may also determine whether there is more data pertaining to the network. This may comprise, for instance, querying another component for data about the network or performing another function to gather data.

Forward chaining may be performed to determine an initial hypothesis on a source of the observed problem. Forward chaining generally is a type of logical reasoning where a computer may start with input data and a set of logical relationships that may be applied to that data, and, from the data and logical relationships, the computer may determine an answer (or, where the data and/or logical relationships are incomplete for determining an answer with complete certainty, a hypothesis).

For example, the data may be "A is true," (e.g., there is no network connection between two computers) and the logical relationship may be "If A is true, then B is true" (e.g., if there is no network connection between two computers, then those two computers cannot communicate). Given this data and this logical relationship, the answer may be "B is true." Here, because the antecedent clause of the logical relationship ("If A is true") is true (because the data is "A is true"), then it may be concluded that the consequent ("then B is true") is also true. There may be significantly more complex data sets and logical relationships used in forward chaining, in general, where it is determined above that B is true, and there is an additional logical relationship that sets forth that, "If B is true, then C is true," then it may be concluded that "C is true." Forward chaining may involve performing multiple iterations of applying the data (and later determined consequents) to the logical rules until at which time no additional consequent is determined to be true in the course of a single iteration.

In some embodiments, backward chaining may be performed on the hypothesis to determine missing data. In view of forward chaining, backward chaining generally then is a type of logical reasoning where an answer or a hypothesis (using the above terminology from the discussion of forward chaining) is used the starting point, and the process moves backwards through logical relationships to determine data that would support the answer or hypothesis if it were true. In backward chaining, the process begins with the answer or hypothesis—"B is true." This is then applied to the logical rule of "If A is true, then B is true," to determine that data that supports A being true also supports the answer or hypothesis that B is true. Note that, using the logical relationship of "If A is true, then B is true," that B being true does not necessarily mean that A is true. There may be situations where B is true and A is not true—the logical relationship only requires that B is true where A is true.

Accordingly, working backwards using backward chaining may uncover other data that would support B being true. Using the above example and adding the logical relationship, "If C is true, then B is true" (to the prior logical relationship of "If A is true, then B is true," the prior data of "A is true" and the hypothesis or answer of "B is true"). From this and using backward chaining, it may be determined that if C were true, it would further support the hypothesis or answer that B is true.

Determining the probability of the hypothesis being true may involve using a Bayesian probability technique. Bayesian probability techniques may be used to determine the likelihood that something is true where it is uncertain and are generated based on applying new information to previously known probabilities. An example of applying Bayesian probability techniques to a scenario for network troubleshooting is as follows. Say that it is determined that a customer (such as customer computer 102A) cannot connect to an instance (such as instance 114A) across the Internet 104. Specifically, there may be a high rate of packet loss of network packets transmitted between the customer computer and the instance. In this scenario, the probabilities of each of the following being the cause of the problem might be: a 20% chance that the cause is an incorrect configuration of the instance; a 50% chance that the cause is an incorrect configuration of the customer computer; and a 30% chance that there is a physical problem with the fiber cable that connects the instance with the customer computer.

Bayesian probability techniques may be used to determine initial (prior) and updated (posterior) probabilities for events. As an example, the failure rate for a network device may be determined to be 1%/month based on a historical failure rate for all network devices for a particular provider. Without knowing anything other than that this is a network device, the probability for this hypothetical is a 1% chance that the network device will fail within one month. If it is also known that the network device is located in North Carolina, then an additional piece of information that is known may be that network devices in North Carolina have a 3% chance of failure within one month. This may be identified as $P(S|N)=0.03$ (which expresses that the probability of a failure event "network device fails" given the data "network device is located in North Carolina" is true is 3%).

In this example, P(S) is what is known about the probability of a network device failure without factoring in the location of the network device and may be referred to as the prior probability in Bayesian terminology. Then $P(S|N)$ is the likelihood of a network device failure if the network device is located in North Carolina is factored in and may be referred to as the posterior probability in Bayesian terminology.

Failure prediction information may be provided to a network administrator, along with items to check to determine whether each possible cause of the problem is the cause of the problem. Should the network administrator check and determine that the instance is correctly configured, then this information may be used in updating the Bayesian probability analysis that the hypothesis is correct.

In this manner, both an initial Bayesian probability analysis may be performed, and a Bayesian probability analysis may be updated as more data is known. An initial Bayesian probability analysis may be performed in this manner where there are default probabilities that certain hypotheses are true for a certain known problem (e.g., a Bayesian probability analysis for a hypothesis that a network connectivity problem is caused by a faulty fiber connection may be initially set to 30% before considering the data). Additionally, a Bayesian probability analysis may be used to update a probability that a hypothesis is correct as more information is known (e.g., a Bayesian probability analysis that a network connectivity problem is caused by a faulty fiber connection may be updated when it is determined after the initial analysis that the cause is not an incorrect configuration of an instance).

Figure 2:
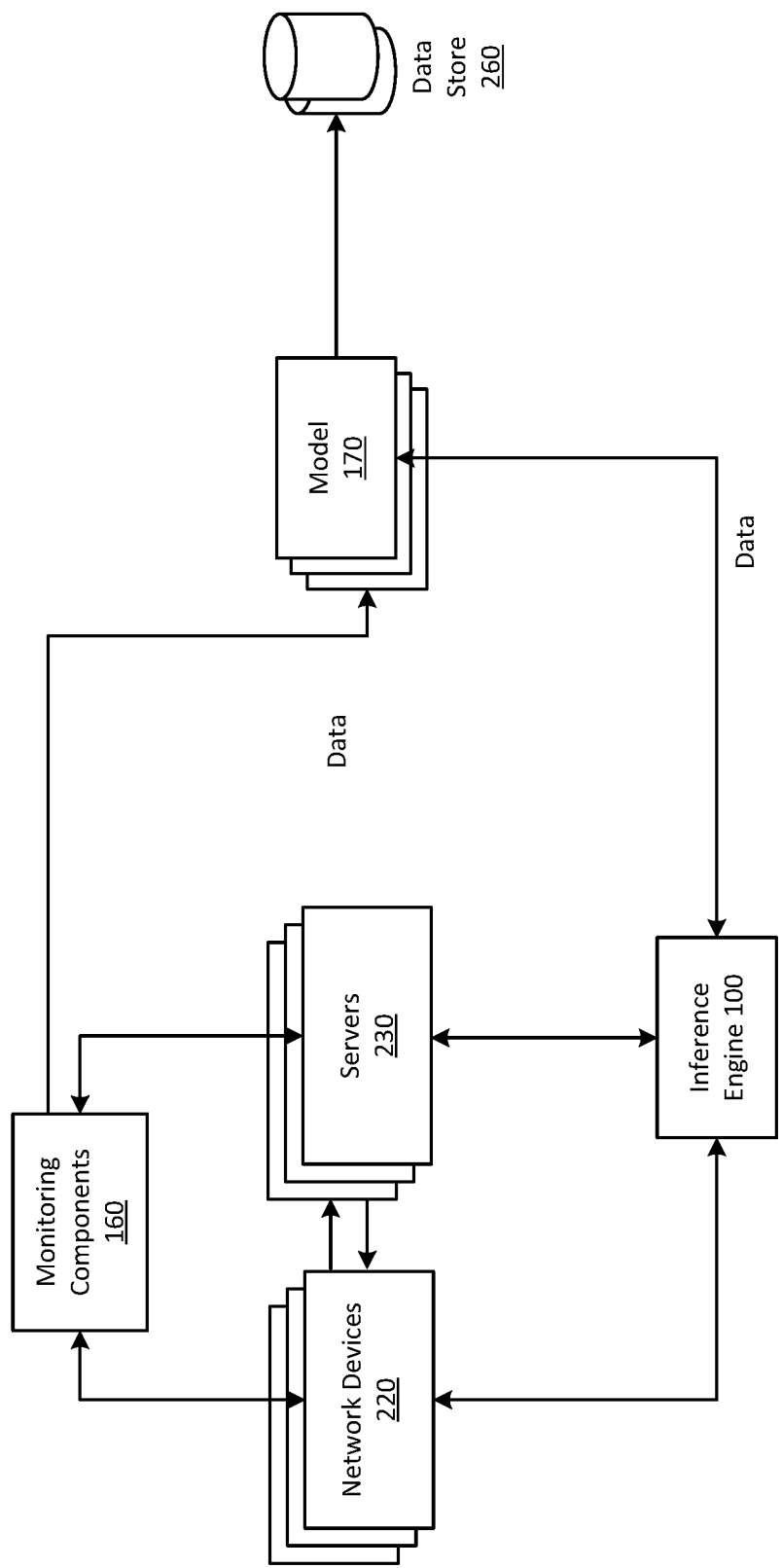
FIG. 2 is a diagram illustrating an example system for managing operability of a provider network in accordance with the present disclosure.

Referring to FIG. 2, illustrated is an example implementation of functionality associated with the inference engine 100 and model 170. Monitoring components 160 may access, or cause access to, various data such as metrics and diagnostic information associated with network devices 220 and servers 230. The model 170 may also generate or cause generation of data. The data collected by monitoring components 160 may be provided to model 170 that may store the diagnostic information in data store 260. The model 170 may manage the various diagnostic information that is to be collected. For example, the model 170 may take actions such as invoke a service to generate a set of available operational data pertaining to a service and the associated device. The monitoring components 160 may also access activity logs for network devices 220 and servers 230, health status for network devices 220 and servers 230, connection states for network devices 220 and servers 230, configurations for network devices 220 and servers 230, and hardware attributes (e.g., server manufacturer, RAM manufacturer, etc.). Other types of data may be accessed as determined by the model 170, such as the type of resource running on a device, type of hardware, physical location, installed software, and so on.

As indicated above, an API or a programming interface sub-system may be provided for facilitating the submission of information requests. The API may be configured to receive electronic messages that encode identifiers indicative of an information request for fulfillment by the inference engine 100. In response to receiving one of the electronic messages, the API may send second electronic messages indicative of information indicating that a diagnostic information request has been received, and provide the results of the diagnostic information collection.

Figure 3:
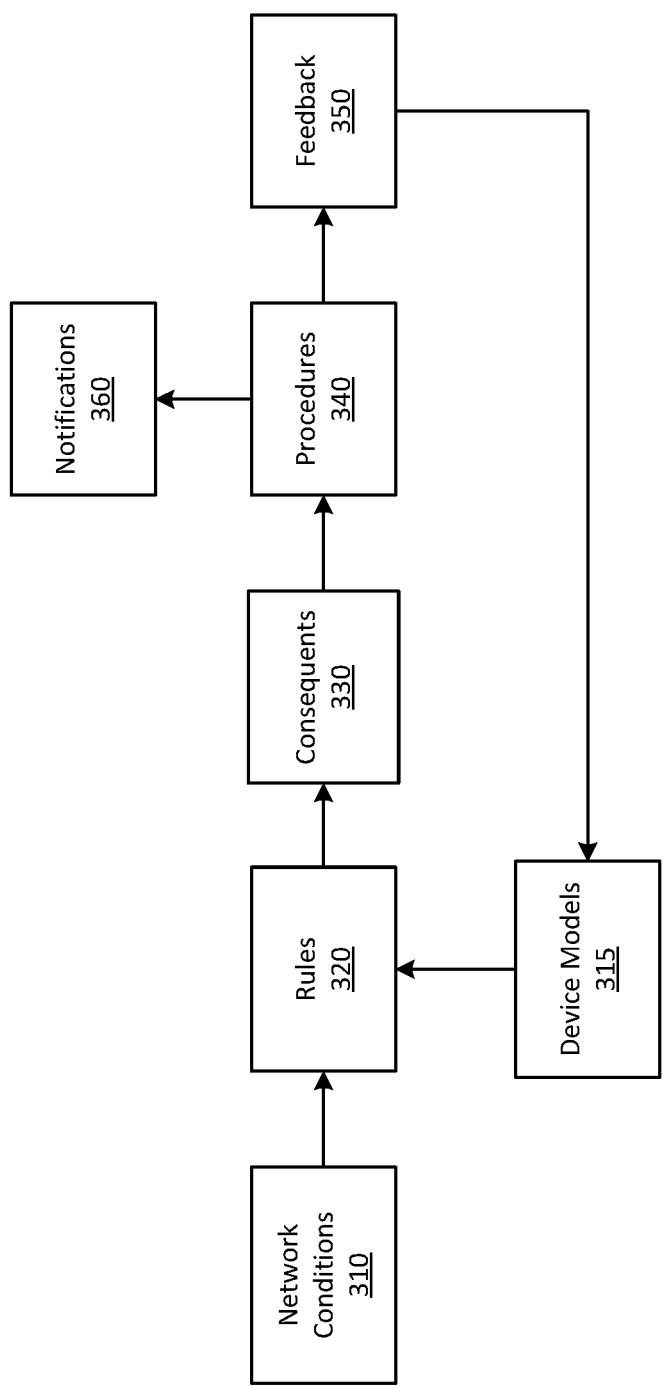
FIG. 3 is a diagram illustrating an example system for managing operability of a provider network in accordance with the present disclosure.

FIG. 3 illustrates functionality of components for managing operability of a provider network comprising a plurality of computing resources. The system may include, for example, one or more computing nodes and one or more memories bearing instructions that, upon execution by the one or more computing nodes, cause the system at least to cause performance of various functions.

A set of rules 320 may receive data indicative of network conditions 310 as well as data from model 315. Based on the network conditions and data from model 315, one of the consequents 330 may be selected. The selected consequent may point to a set of procedures 340 for execution. Notifications 360 may be sent to service owners prior to execution of the procedures 340. Feedback 350 may include results of the execution, which may be input to the device models 315 to update models based on results of the executed set of procedures.

Figure 4:
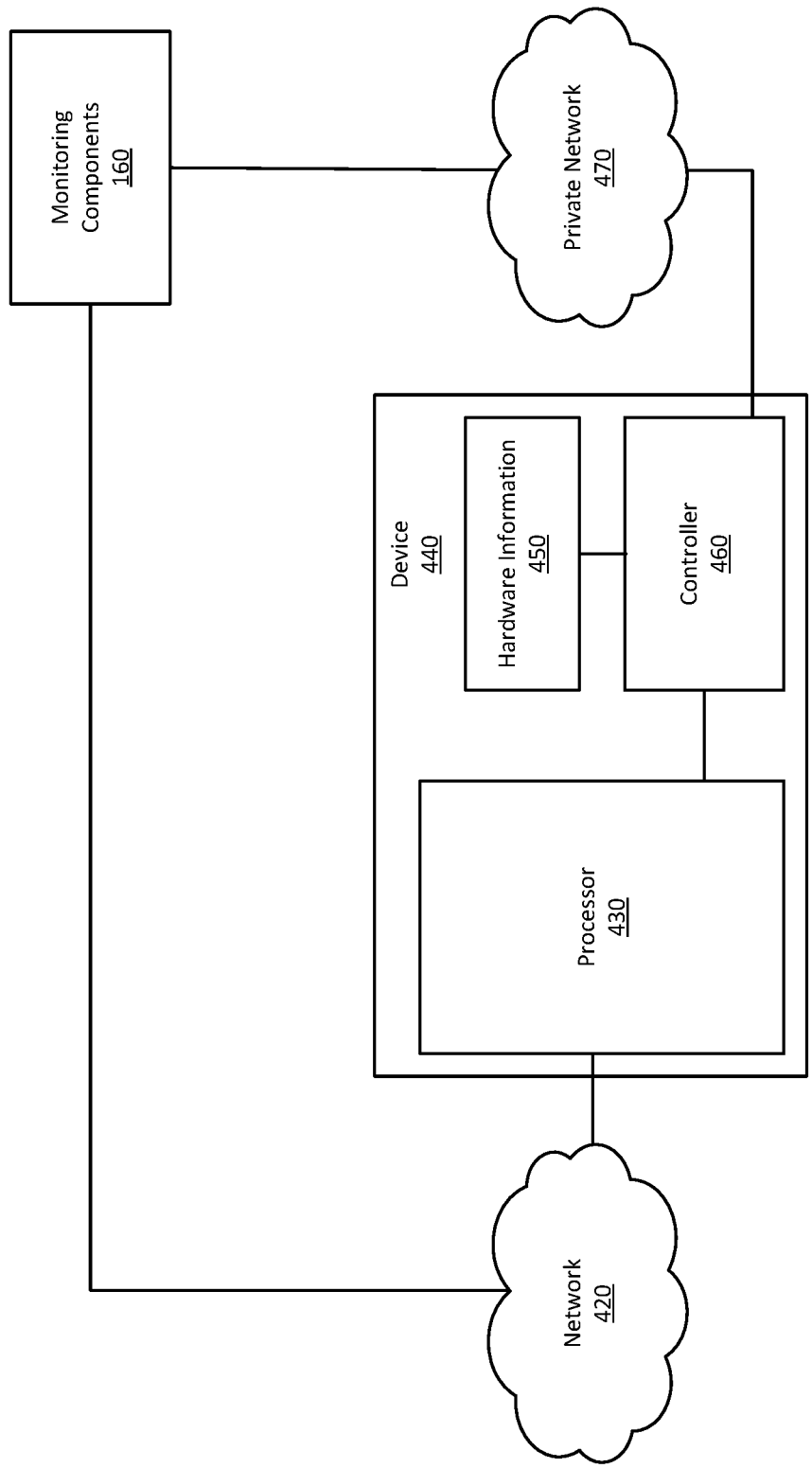
FIG. 4 is a diagram illustrating an example system for managing operability of a provider network in accordance with the present disclosure.

FIG. 4 is a diagram illustrating an example of accessing data for managing operability of a provider network in accordance with the present disclosure. Referring to FIG. 4, illustrated is a device 440 that may be operational in a data center and that may provide computing or network services. It will be appreciated that some embodiments may involve additional devices and networks. FIG. 4 illustrates that device 440 has various hardware information 450 that may include hardware diagnostic information such as management data, processor register data, and the like. FIG. 4 also illustrates that device 440 includes a controller 460 that may be implemented as a programmed processor or microcontroller installed on the motherboard of device 440. The controller 460 may be programmed to control processor 430 of device 440, various hardware systems and hardware information sources of device 440, and private network 470. Various hardware systems and devices of device 440 may report diagnostic information to controller 460. The controller 460 may be configured to provide the hardware information 450 as part of the out-of-band communications that can operate without normal operation of processor 430. FIG. 4 illustrates that device 440 may provide services via the in-band operations during normal operation. Device 440 may communicate with other systems during in-band operations via network 420, which is separate from the private network 470.

Figure 5:
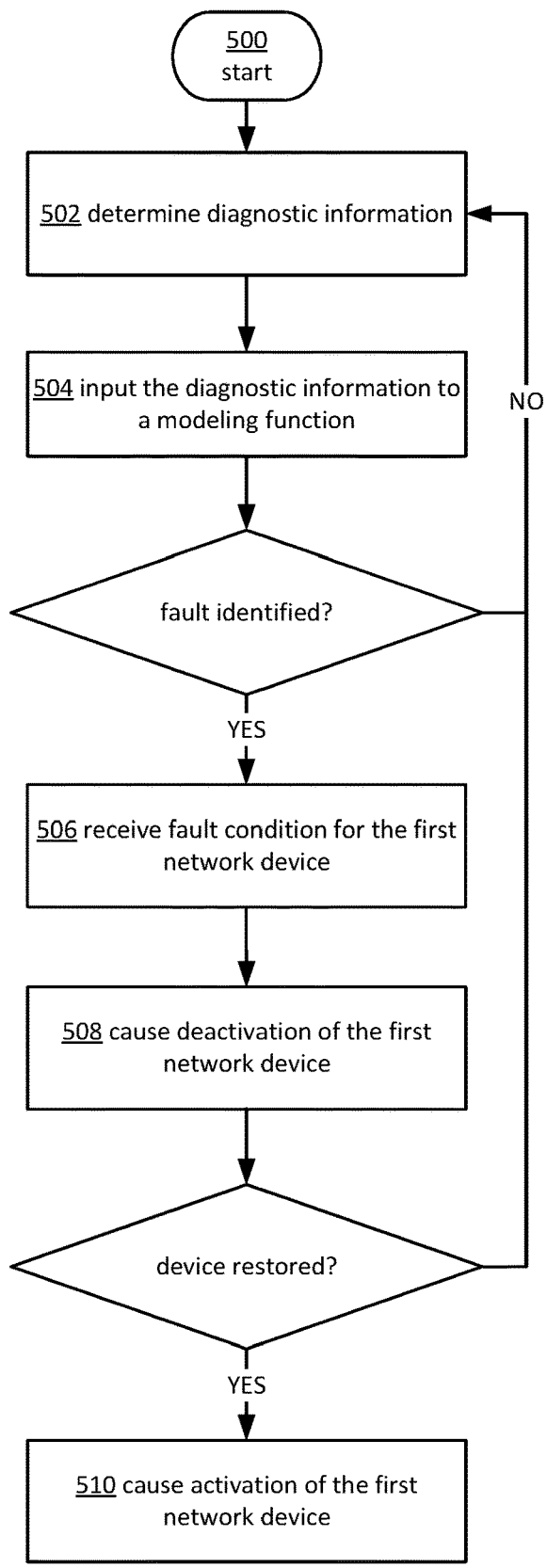
FIG. 5 is a flowchart depicting an example procedure for managing operability of a provider network in accordance with the present disclosure.

FIG. 5 illustrates an example operational procedure for managing operability of a provider network comprising a plurality of computing resources. In an embodiment, a mechanism for providing resource status can be provided by services such as inference engine 100 in FIG. 1. The operational procedure may be implemented in a system comprising one or more computing devices. Referring to FIG. 5, operation 500 begins the operational procedure. Operation 500 may be followed by operation 502. Operation 502 illustrates determining diagnostic information for a first of the plurality of network devices. Operation 502 may be followed by operation 504. Operation 504 illustrates inputting the diagnostic information to a modeling function that is based at least in part on one or more of a signature, type, failure scenarios, and capacity of the plurality of network devices.

If a fault is identified, then operation 504 may be followed by operation 506. Operation 506 illustrates receiving an indication of at least one fault condition for the first network device based at least in part on the modeling function.

Operation 506 may be followed by operation 508. Operation 508 illustrates automatically causing deactivation of the first network device based on the at least one fault condition. If the first network device is restored, then operation 508 may be followed by operation 510, which illustrates causing activation of the first network device, or other restorative action.

The above described aspects of the disclosure have been described with regard to certain examples and embodiments, which are intended to illustrate but not to limit the disclosure. It should be appreciated that the subject matter presented herein may be implemented as a computer process, a computer-controlled apparatus or a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network.

In a distributed computing environment, program modules may be located in both local and remote memory storage devices.

Networks established by or on behalf of an entity such as a company or organization to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 6:
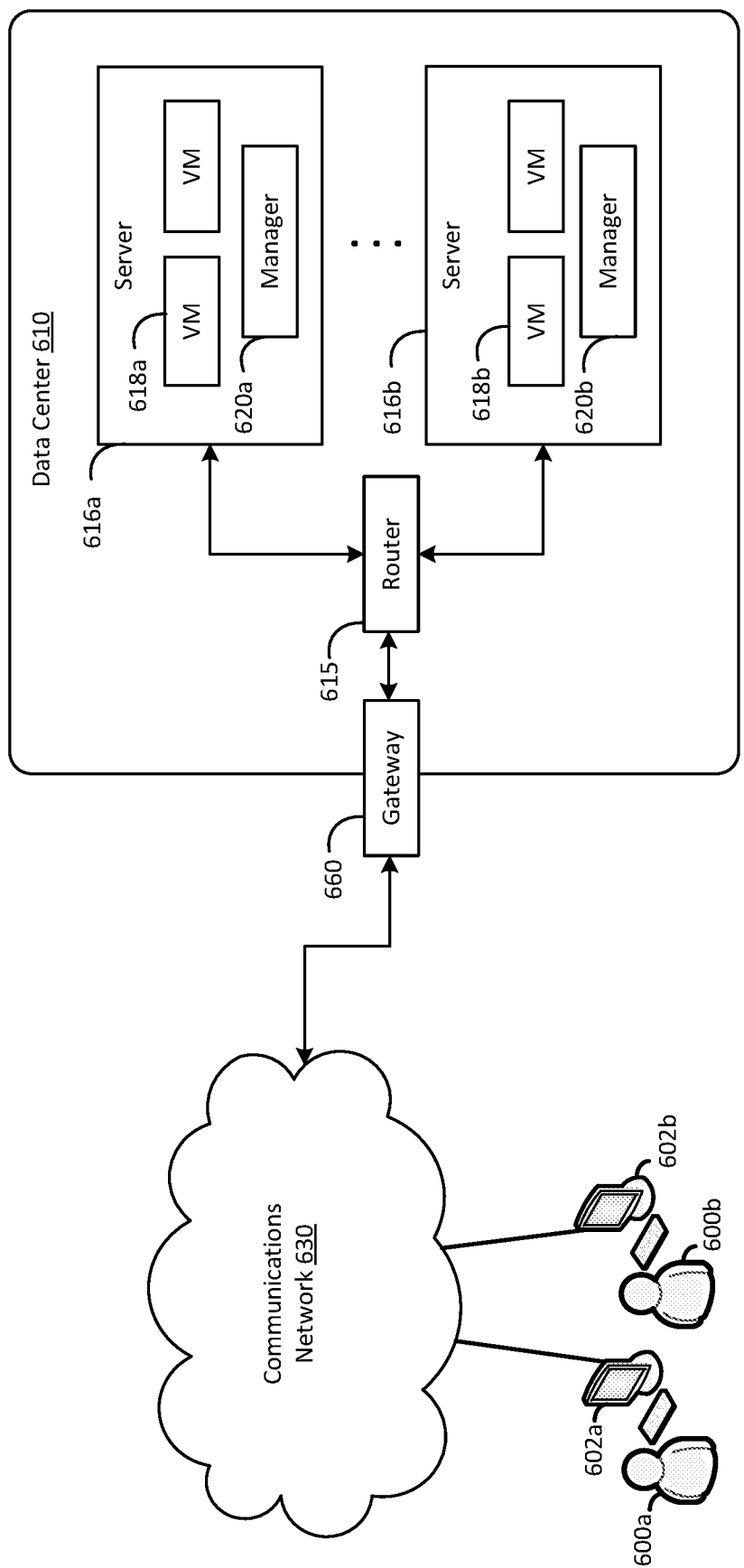
FIG. 6 is a diagram illustrating an example computing system that may be used in some embodiments.

FIG. 6 illustrates an example computing environment in which the embodiments described herein may be implemented. FIG. 6 is a diagram schematically illustrating an example of a data center 610 that can provide computing resources to users 600a and 600b (which may be referred herein singularly as "a user 600" or in the plural as "the users 600") via user computers 602a and 602b (which may be referred herein singularly as "a computer 602" or in the plural as "the computers 602") via a communications network 630. Data center 610 may be configured to provide computing resources for executing applications on a permanent or an as-needed basis. The computing resources provided by data center 610 may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices, and the like.

Each type or configuration of computing resource may be available in different sizes, such as large resources, consisting of many processors, large amounts of memory and/or large storage capacity, and small resources consisting of fewer processors, smaller amounts of memory and/or smaller storage capacity. Customers may choose to allocate a number of small processing resources as web servers and/or one large processing resource as a database server, for example.

Data center 610 may include servers 616a and 616b (which may be referred herein singularly as "a server 616" or in the plural as "the servers 616") that provide computing resources available as virtual machine instances 618a and 618b (which may be referred herein singularly as "a virtual machine instance 618" or in the plural as "the virtual machine instances 618"). The virtual machine instances 618 may be configured to execute applications, including web servers, application servers, media servers, database servers, and the like. Other resources that may be provided include data storage resources (not shown) and may include file storage devices, block storage devices, and the like.

The availability of virtualization technologies for computing hardware has provided benefits for providing large scale computing resources for customers and allowing computing resources to be efficiently and securely shared between multiple customers. For example, virtualization technologies such as those provided by VMware or other virtualization systems may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 6, communications network 630 may, for example, be a publicly accessible network of linked networks and possibly operated by various distinct parties, such as the Internet. In other embodiments, communications network 630 may be a private network, such as, for example, a corporate or university network that is wholly or partially inaccessible to non-privileged users. In still other embodiments, communications network 630 may include one or more private networks with access to and/or from the Internet.

Communications network 630 may provide access to computers 602. Computers 602 may be computers utilized by customers 600 or other customers of data center 610. For instance, user computer 602a or 602b may be a server, a desktop or laptop personal computer, a tablet computer, a wireless telephone, a personal digital assistant (PDA), an e-book reader, a game console, a set-top box, or any other computing device capable of accessing data center 610. User computer 602a or 602b may connect directly to the Internet (e.g., via a cable modem or a Digital Subscriber Line (DSL)). Although only two user computers 602a and 602b are depicted, it should be appreciated that there may be multiple user computers.

Computers 602 may also be utilized to configure aspects of the computing resources provided by data center 610. In this regard, data center 610 might provide a web interface through which aspects of its operation may be configured through the use of a web browser application program executing on user computer 602. Alternatively, a stand-alone application program executing on user computer 602 might access an application programming interface (API) exposed by data center 610 for performing the configuration operations. Other mechanisms for configuring the operation of the data center 610, including deploying updates to an application, might also be utilized.

Servers 616a and 616b (which may be referred herein singularly as "a server 616" or in the plural as "the servers 616") shown in FIG. 6 may be standard servers configured appropriately for providing the computing resources described above and may provide computing resources for executing one or more applications. In one embodiment, the computing resources may be virtual machine instances 618. In the example of virtual machine instances, each of the servers 616 may be configured to execute an instance manager 620a or 620b (which may be referred herein singularly as "an instance manager 620" or in the plural as "the instance managers 620") capable of executing the virtual machine instances. The instance managers 620 may be a virtual machine monitor (VMM) or another type of program configured to enable the execution of virtual machine instances 618 on servers 616, for example. As discussed above, each of the virtual machine instances 618 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 610 shown in FIG. 6, a router 615 may be utilized to interconnect the servers 616a and 616b. Router 615 may also be connected to gateway 660, which is connected to communications network 630. Router 615 may manage communications within networks in data center 610, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 610 described in FIG. 6 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 7:
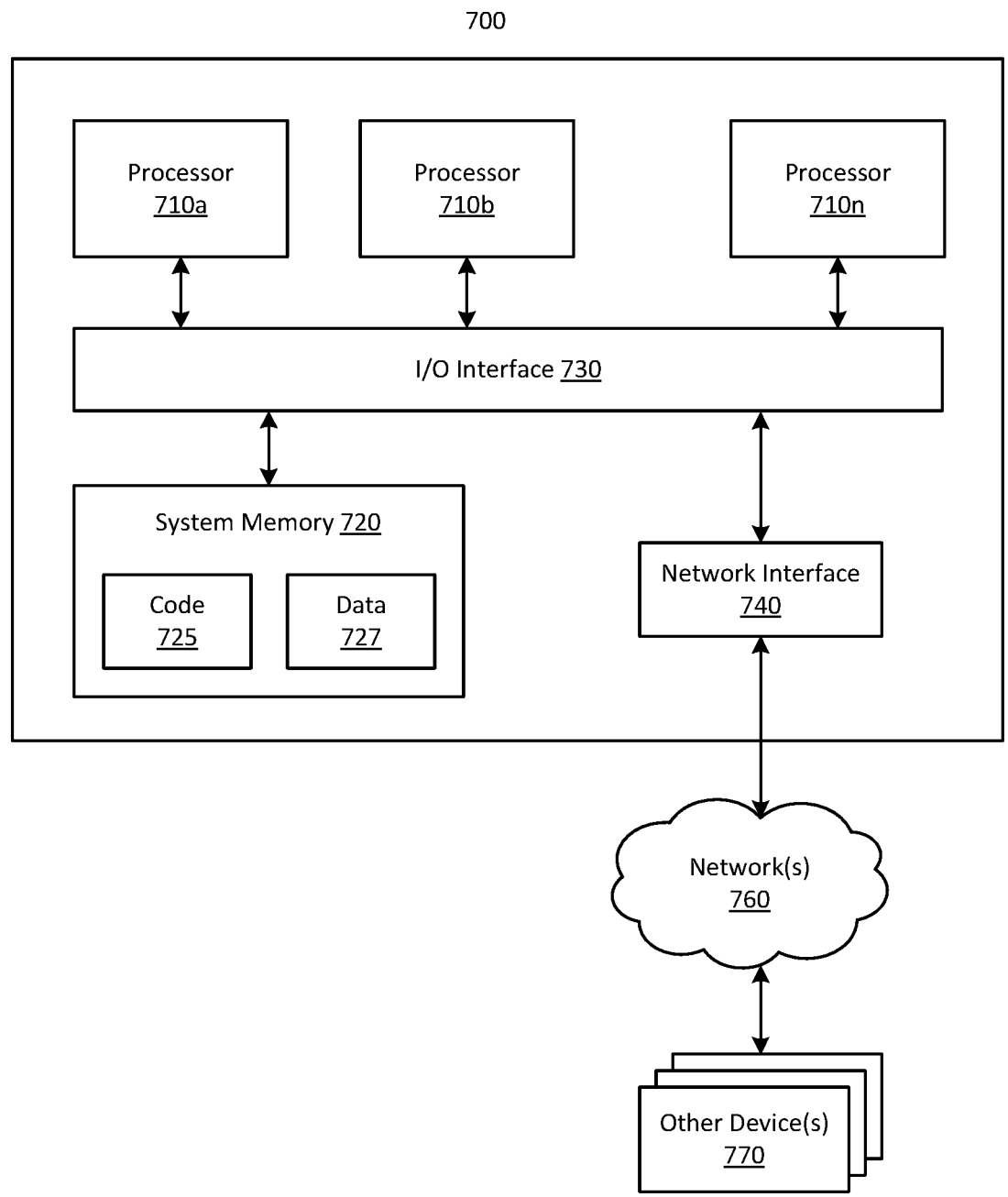
FIG. 7 is a diagram illustrating an example computing system that may be used in some embodiments.

In at least some embodiments, a server that implements a portion or all of one or more of the technologies described herein, including the techniques to implement the functionality of an inference engine 100 may include a general-purpose computer system that includes or is configured to access one or more computer-accessible media. FIG. 7 illustrates such a general-purpose computing device 700. In the illustrated embodiment, computing device 700 includes one or more processors 710a, 710b, and/or 710n (which may be referred herein singularly as "a processor 710" or in the plural as "the processors 710") coupled to a system memory 720 via an input/output (I/O) interface 730. Computing device 1000 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x87, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 720 as code 725 and data 727.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing, or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computing device 700 and other device or devices 770 attached to a network or network(s) 760, such as other computer systems or devices as illustrated in FIGS. 1 through 4, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fibre Channel SANs or via any other suitable type of network and/or protocol.

In some embodiments, system memory 720 may be one embodiment of a computer-accessible medium configured to store program instructions and data as described above for FIGS. 1-5 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 700 via I/O interface 730. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 700 as system memory 720 or another type of memory. Further, a computer-accessible medium may include transmission media or signals such as electrical, electromagnetic or digital signals, conveyed via a communication medium such as a network and/or a wireless link, such as may be implemented via network interface 740. Portions or all of multiple computing devices such as those illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for managing operability of a provider network comprising a plurality of network devices, the system comprising:
   one or more computing nodes; and
   one or more memories bearing instructions that, upon execution by the one or more computing nodes, cause the system at least to:
   determine diagnostic information comprising an error rate for a first of the plurality of network devices;
   input the diagnostic information to a rules-based modeling function that comprises an inference engine configured to identify conditions that are indicative of a potential failure for the plurality of network devices, wherein the rules-based modeling function that is comprises rules based at least in part on at least one of a signature, type, failure scenarios, or capacity of the plurality of network devices and a plurality of forward-chaining rules comprising one or more antecedents and a corresponding consequent;
   identify at least one fault condition for the first network device based at least in part on the rules-based modeling function;
   determine whether the provider network has sufficient capacity to process network traffic if the first network device is deactivated; and
   automatically cause deactivation of the first network device based on the at least one fault condition and the determined network capacity.

2. The system of claim 1, further comprising instructions that, upon execution by the one or more computing nodes, cause the system at least to restore the first network device based at least in part on receipt of an indication that the first network device is operational.

3. The system of claim 1 wherein the one or more computing nodes comprise virtual machine instances operating on a plurality of computing devices, the computing devices comprising a data center.

4. The system of claim 1, wherein the inference engine is configured to perform backward chaining to determine additional data that would increase a likelihood that the at least one potential fault condition for the first one of the computing devices has been correctly determined.

5. A method of managing operability of a provider network comprising a plurality of computing devices, the method comprising:
   processing, by an inference engine executing on a programmed computing node, the inference engine including a plurality of forward-chaining rules comprising one or more antecedents and a corresponding consequent, data comprising an error rate indicative of an operational state of the computing devices of the provider network, the inference engine configured to apply the data to a rule-based model of operational characteristics of the computing devices of the provider network;
   determining, by the inference engine, at least one potential fault condition for a first one of the computing devices of the provider network based on said processing;
   determining whether the provider network has sufficient capacity to process network traffic if a first network device is deactivated; and
   invoking a remedial action based on the at least one potential fault condition.

6. The method of claim 5, wherein the operational characteristics include one or more of a signature, type, failure scenarios, and capacity of the computing devices of the provider network.

7. The method of claim 5, wherein the remedial action comprises deactivation of one of the computing devices of the provider network.

8. The method of claim 7, further comprising restoring the one computing device based at least in part on determining, by the inference engine, that the one computing device is operational.

9. The method of claim 5, wherein the inference engine is configured to perform backward chaining to determine additional data that would increase a likelihood that the at least one potential fault condition for the first one of the computing devices has been correctly determined.

10. The method of claim 5, wherein the inference engine is configured to perform a Bayesian analysis on the data to determine the at least one potential fault condition.

11. The method of claim 5, wherein the data indicative of the operational state of the computing devices is received from monitoring components communicatively coupled to the provider network.

12. The method of claim 5, further comprising updating the inference engine based at least in part on information that the determined potential fault condition was correct.

13. The method of claim 7, wherein the remedial action includes restoring a service associated with the first one of the computing devices at a reduced capacity.

14. The method of claim 8, wherein the restoring comprises execution of a predefined procedure to restore a service associated with the first one of the computing devices to its original state.

15. A non-transitory computer-readable storage medium having stored thereon computer-readable instructions, the computer-readable instructions comprising instructions that upon execution on one or more computing devices, at least cause the one or more computing devices to:

apply input data comprising error rate data to forward chaining rules based on at least one of a type, failure scenario, or capacity of a networking device of a provider network to determine a consequent remedial action associated with the networking device;

determine whether the provider network has sufficient capacity to process network traffic if the first network device is deactivated; and initiate the consequent remedial action based on the capacity determination; and using forward chaining to determine a consequent restorative action associated with the networking device.

16. The computer-readable storage medium of claim 15, wherein the forward chaining is performed by an inference engine configured to model signature characteristics of a plurality of networking devices of the provider network.

17. The computer-readable storage medium of claim 15, wherein the forward chaining is defined by rules comprising one or more antecedents and a corresponding consequent.

18. The computer-readable storage medium of claim 15, further comprising instructions that upon execution on one or more computing devices, at least cause the one or more computing devices to implement an application programming interface (API) configured to:

receive first electronic messages that encode identifiers indicative of a request for the remedial action; and in response to receiving one of the first electronic messages, send second electronic messages indicative of information pertaining to the request.

19. The computer-readable storage medium of claim 15, further comprising instructions that upon execution on one or more computing devices, at least cause the one or more computing devices to notify at least one service owner prior to initiating the consequent remedial action.

\* \* \* \* \*